US006875356B2

(12) United States Patent
Perriello

(10) Patent No.: US 6,875,356 B2
(45) Date of Patent: Apr. 5, 2005

(54) METHOD AND APPARATUS FOR RECOVERY OF METALS WITH HYDROCARBON-UTILIZING BACTERIA

(75) Inventor: Felix Anthony Perriello, Norwood, MA (US)

(73) Assignee: Global BioSciences, Inc., North Attleborough, MA (US)

(*) Notice: Subject to any disclaimer, the term of this patent is extended or adjusted under 35 U.S.C. 154(b) by 57 days.

(21) Appl. No.: 10/206,636

(22) Filed: Jul. 26, 2002

(65) Prior Publication Data

US 2003/0034301 A1 Feb. 20, 2003

Related U.S. Application Data

(60) Provisional application No. 60/308,211, filed on Jul. 27, 2001.

(51) Int. Cl.$^7$ .................................................. C02F 3/30
(52) U.S. Cl. ........................ 210/605; 210/611; 210/620
(58) Field of Search .............................. 210/605, 610, 210/611, 620, 629

(56) References Cited

U.S. PATENT DOCUMENTS

| | | |
|---|---|---|
| 3,242,071 A | 3/1966 | Walker |
| 3,969,446 A | 7/1976 | Franklin, Jr. |
| 4,033,763 A | 7/1977 | Markels, Jr. |
| 4,111,808 A | 9/1978 | Fair |
| 4,328,175 A | 5/1982 | Roeckel et al. |
| 4,454,077 A | 6/1984 | Litz |
| 4,522,723 A | 6/1985 | Kauffman et al. |
| 4,637,865 A | 1/1987 | Sergent et al. |
| 4,645,603 A | 2/1987 | Frankl |
| 4,695,378 A | 9/1987 | Ackman et al. |
| RE32,562 E | 12/1987 | Litz |
| 4,729,788 A | 3/1988 | Hutchins et al. |
| 4,740,243 A | 4/1988 | Krebs-Yuill et al. |

(Continued)

OTHER PUBLICATIONS

Wilson et al., "Biological Treatment of Trichloroethylene and 1,1,1–Trichloroethane from Contaminated Air Streams", Proceedings of Petroleum Hydrocarbons and Organic Chemicals in Ground Water: Prevention, Detection and Restoration (The Westin Galleria, Houston, Nov. 9–11, 1988), v2, pp. 823–831, published in 1989.

*Primary Examiner*—Robert A. Hopkins
(74) *Attorney, Agent, or Firm*—Alan G. Towner, Esq.; Pietragallo, Bosick & Gordon

(57) ABSTRACT

Methods and apparatus are disclosed for recovering metals from metal-containing support materials such as mineral ores. In one embodiment, the metal may be separated from crushed support material or ore in a bioleaching lagoon by the action of hydrocarbon-utilizing bacteria under anaerobic conditions. The bioleached material is then pumped into a precipitation lagoon where hydrocarbon-utilizing bacteria oxidize the metals under aerobic conditions. In another embodiment, metals may be directly biooxidized from a heap of the metal-containing support material having a hydrocarbon/oxygen injection system embedded therein. A water sprinkler system may be used to wet the heap while the hydrocarbon/oxygen injection system stimulates the growth of hydrocarbon-utilizing bacteria. The resulting effluent solution may be pumped or gravity fed to an aerobic precipitation lagoon where aerobic hydrocarbon-utilizing bacteria are used to precipitate or otherwise deposit the metals onto a deposition material.

49 Claims, 2 Drawing Sheets

U.S. PATENT DOCUMENTS

| | | | |
|---|---|---|---|
| 4,822,413 A | | 4/1989 | Pooley et al. |
| 4,956,080 A | | 9/1990 | Josefik |
| 4,987,081 A | | 1/1991 | Hackl et al. |
| 5,057,221 A | * | 10/1991 | Bryant et al. ............... 210/610 |
| 5,061,406 A | | 10/1991 | Cheng |
| 5,073,309 A | | 12/1991 | Bousquet et al. |
| 5,085,809 A | | 2/1992 | Stirling |
| 5,089,412 A | | 2/1992 | Hackl et al. |
| 5,127,942 A | | 7/1992 | Brierley et al. |
| 5,314,076 A | | 5/1994 | La Place et al. |
| 5,494,576 A | | 2/1996 | Hoppe et al. |
| 5,688,304 A | * | 11/1997 | Kohr et al. ................... 75/712 |
| 5,834,294 A | | 11/1998 | Brierley et al. |
| 5,888,396 A | | 3/1999 | Perriello |
| 5,916,491 A | | 6/1999 | Hills |
| 5,925,290 A | | 7/1999 | Hills |
| 5,948,375 A | | 9/1999 | Stallknecht |
| 6,051,130 A | | 4/2000 | Perriello |
| 6,110,372 A | | 8/2000 | Perriello |
| 6,146,444 A | | 11/2000 | Kohr |
| 6,156,203 A | | 12/2000 | Anthony |
| 6,210,579 B1 | | 4/2001 | Perriello |
| 6,244,346 B1 | | 6/2001 | Perriello |
| 6,245,235 B1 | | 6/2001 | Perriello |
| 6,355,175 B1 | | 3/2002 | Green et al. |
| 6,361,694 B1 | | 3/2002 | Trost |
| 6,383,388 B1 | | 5/2002 | Krauter et al. |
| 6,383,458 B1 | | 5/2002 | Brierley et al. |
| 6,387,239 B1 | | 5/2002 | Duyvesteyn et al. |
| 6,488,850 B2 | | 12/2002 | Perriello |
| 2001/0023847 A1 | | 9/2001 | Perriello |
| 2002/0012620 A1 | | 1/2002 | Suzuki et al. |
| 2002/0066566 A1 | | 6/2002 | Perriello |
| 2002/0195389 A1 | | 12/2002 | Perriello |
| 2003/0034301 A1 | | 2/2003 | Perriello |
| 2003/0044966 A1 | | 3/2003 | Perriello |
| 2003/0062306 A1 | | 4/2003 | Perriello |
| 2003/0066322 A1 | | 4/2003 | Perriello |
| 2003/0084609 A1 | | 5/2003 | Perriello et al. |
| 2003/0136735 A1 | | 7/2003 | Perriello |
| 2003/0167686 A1 | | 9/2003 | Perriello |
| 2003/0201227 A1 | | 10/2003 | Perriello |

* cited by examiner ns of Invention

METHOD AND APPARATUS FOR RECOVERY OF METALS WITH HYDROCARBON-UTILIZING BACTERIA

CROSS-REFERENCE TO RELATED APPLICATION

This application claims the benefit of U.S. Provisional Application Ser. No. 60/308,211, filed Jul. 27, 2001, which is incorporated herein by reference.

FIELD OF THE INVENTION

The present invention relates to the recovery of metals from metal-containing support materials, and more particularly relates to a method and apparatus for recovering metals from support materials with hydrocarbon-utilizing bacteria.

BACKGROUND INFORMATION

Precious metal ores such as gold ores can be categorized as either free milling or refractory. Free milling ores are those that can be processed by simple gravity techniques or direct cyanidation. Refractory ores, on the other hand, are not amenable to conventional cyanidation treatment. Such ores are often refractory because of their excessive content of metallic sulfides such as pyrite or organic carbonaceous matter. A large number of refractory ores consist of ores with a precious metal such as gold occluded in iron sulfide particles. The iron sulfide particles consist principally of pyrite and arsenopyrite. If gold or other precious metals remain occluded within the sulfide host, even after grinding, then the sulfides must be oxidized to liberate the encapsulated precious metal values and make them amenable to a leaching agent.

Conventional biological methods have focused on the recovery of precious metals using sulfur-oxidizing bacteria. A conventional process includes the steps of distributing a concentrate of refractory sulfide minerals on top of a heap of material, biooxidizing the concentrate of refractory sulfide minerals, leaching precious metal values from the biooxidized refractory sulfide minerals with a lixiviant, and recovering precious metal values from the lixiviant.

Problems exist using sulfur-oxidizing organisms in bioleaching processes. These problems include nutrient access, air access, carbon dioxide access, the generation of sulfuric acid from reactions of the sulfur-oxidizing bacteria, and the generation of heat during the exothermic biooxidation reactions which can kill growing bacteria. Ores that are low in sulfide or pyrite, or ores that are high in acid consuming materials such as calcium carbonate or other carbonates, may also be problematic during heap biooxidation processes. The acid generated by these low pyrite ores is insufficient to maintain the low pH and high iron concentration needed for bacteria growth.

The bioremediation of various pollutants using butane-utilizing bacteria is disclosed in U.S. Pat. Nos. 5,888,396, 6,051,130, 6,110,372, 6,156,203, 6,210,579, 6,244,346 and 6,245,235, which are herein incorporated by reference.

SUMMARY OF THE INVENTION

In accordance with the present invention, metals such as precious metals are recovered from metal-containing support materials such as mineral ores. The support material is contacted with a solution containing a hydrocarbon which stimulates the growth of hydrocarbon-utilizing bacteria. The hydrocarbon may comprise one or more alkanes, such as butane, methane, ethane and/or propane, or other types of hydrocarbons.

Gold, silver, platinum, copper, zinc, nickel, uranium, palladium and the like may be recovered using the present invention. One embodiment of the present invention provides for the treatment of metal-containing support materials in the form of slurries contained in lagoons, tanks or other vessels. Another embodiment of the present invention provides a bioleaching technique, which initially uses hydrocarbon-utilizing bacteria under anaerobic conditions to pretreat ore-containing materials for subsequent biooxidation using hydrocarbon-utilizing bacteria under aerobic conditions. The process can be used to biooxidize metal-containing support materials such as precious metal-bearing refractory sulfide ores. A further embodiment of the present invention provides a heap bioleaching process. In one embodiment of this process, ores that are low in sulfide minerals, or ores that are high in acid consuming materials such as calcium carbonate, may be treated.

In addition to precious metal-bearing sulfide minerals, there are many other sulfide ores that can be treated using the present process, such as copper ores, zinc ores, nickel ores and uranium ores. Biooxidation with hydrocarbon-utilizing bacteria can be used to cause the dissolution of metal values such as copper, zinc, nickel and uranium from concentrates of these ores.

An aspect of the present invention is to provide a method of recovering a metal from a metal-containing support material. The method includes contacting the support material with a hydrocarbon to stimulate the growth of hydrocarbon-utilizing bacteria, and recovering the metal from the support material.

Another aspect of the present invention is to provide a system for recovering metal from a metal-containing support material. The system includes means for contacting the support material with a hydrocarbon to stimulate the growth of hydrocarbon-utilizing bacteria, and means for recovering the metal from the support material.

A further aspect of the present invention is to provide a system for metal recovery from a support material, wherein the system includes a source of hydrocarbon, a hydrocarbon injection system in communication with the hydrocarbon source and the support material, and a deposition material upon which the metal is deposited.

These and other aspects of the present invention will be more apparent from the following description.

DETAILED DESCRIPTION

Figure 1:
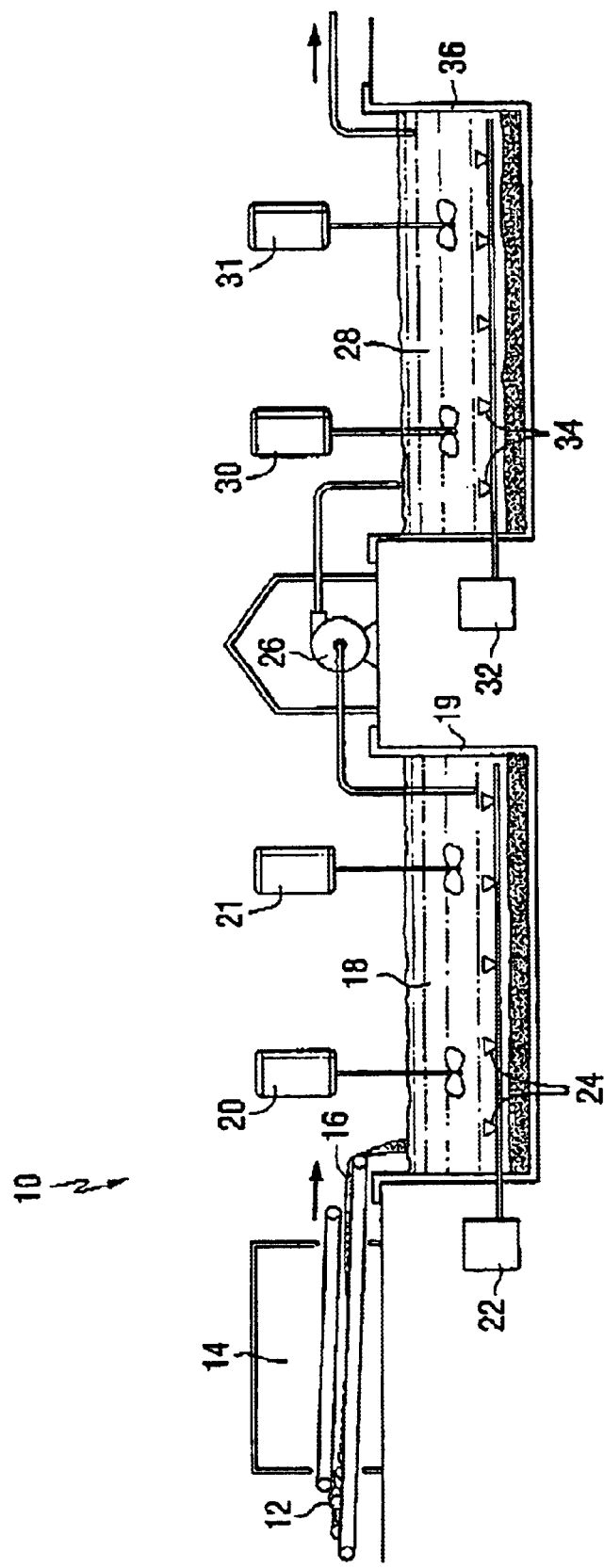
FIG. 1 is a schematic diagram illustrating the use of anaerobic and aerobic hydrocarbon-utilizing bacteria to bioleach and precipitate (biooxidize) metals from a metal-containing support material.

In accordance with the present invention, hydrocarbon-utilizing bacteria are used to liberate metals from metal-containing support materials such as mineral ores. The process may be used to biooxidize metals from ore-containing material using hydrocarbons under aerobic conditions only. Alternatively, the process may use anaerobic and aerobic processes to pretreat and biooxidize metals from ore-containing materials. The ore type and metal composition may determine which process would yield the most favorable metal recover. Under anaerobic conditions, the hydrocarbon may serve as an electron donor and carbon source while sulfate originating from the ore may serve as a final electron acceptor. Other electron acceptors may be used, such as nitrate, iron or carbon dioxide. Subsequently, aerobic hydrocarbon-utilizing organisms and their operative enzymes may be used to precipitate metals from solution, which may then be recovered.

In accordance with an embodiment of the present invention, a hydrocarbon such as butane may be utilized to drive a treatment process anaerobic, thereby encouraging the growth of anaerobic microorganisms capable of reducing sulfur-containing compounds. Under anaerobic conditions, sulfate and elemental sulfur may serve as electron acceptors while the hydrocarbon substrate is oxidized. The anaerobic processes may include, for example, desulfurization, sulfur respiration and dissimilatory sulfate reduction. A hydrocarbon such as butane may be used to enhance anaerobic microbiological processes thereby liberating precious metals from recalcitrant sulfide ore bodies. Subsequently, aerobic hydrocarbon-utilizing bacteria may be used to precipitate (biooxidize) metals from solution, which may then be recovered.

The metal-containing support material may include sulfide-containing mineral ores, such as precious metal-containing ores, copper ores, zinc ores, nickel ores and uranium ores. The sulfide-containing minerals and ore material may be, for example, coarsely or finely ground ore. The support material may also include lava rock, gravel, sand deposits or any other geologic materials. The recovered metals may include gold, silver, platinum, palladium, copper, zinc, nickel and uranium or any other metal or precious metal.

The hydrocarbon may comprise one or more alkanes, alkenes, alkynes, poly(alkene)s, poly(alkyne)s, aromatic hydrocarbons, aromatic hydrocarbon polymers or aliphatic hydrocarbons. The hydrocarbons preferably comprise at least one alkane such as butane, methane, ethane or propane. In a preferred embodiment, the hydrocarbon comprises butane which may serve as an electron donor under aerobic or anaerobic conditions. The high solubility of butane facilitates dispersion of the hydrocarbon food source throughout the metal-containing support material. Furthermore, the high solubility of butane may accelerate the transformation of aerobic conditions to anaerobic by initially stimulating the growth of aerobic butane-utilizing microorganisms in the presence of oxygen to produce carbon dioxide. As the oxygen is depleted and anaerobic conditions prevail, butane or another hydrocarbon may serve as an electron donor to enhance anaerobic microbiological processes that will aid in the leaching of metals from the metal-containing support material.

In accordance with a preferred embodiment, butane is the most prevalent compound of the hydrocarbon substrate on a weight percent basis, and typically comprises at least about 10 weight percent of the hydrocarbon substrate. The other constituents of the hydrocarbon substrate may include other alkanes or other hydrocarbons, as well as inert gases such as nitrogen, helium or argon. The hydrocarbon substrate preferably comprises at least about 50 weight percent butane. More preferably, the hydrocarbon substrate comprises at least about 90 weight percent butane. In a particular embodiment, the hydrocarbon substrate comprises at least about 99 weight percent n-butane. The butane may contain straight (n-butane) and/or branched chained compounds such as iso-butane.

Suitable hydrocarbon-utilizing bacteria may include the following Groups (in addition to fungi, algae, protozoa, rotifers and other aerobic and anaerobic microbial populations found in decaying materials):

Group 1: The Spirochetes

Group 2: Aerobic/Microaerophilic, motile, helical/vibroid, gram-negative bacteria Group 3: Nonmotile (or rarely motile), gram-negative bacteria Group 4: Gram-negative aerobic/microaerophilic rods and *cocci*

Group 5: Facultatively anaerobic gram-negative rods

Group 6: Gram-negative, anaerobic, straight, curved, and helical bacteria

Group 7: Dissimilatory sulfate- or sulfur-reducing bacteria

Group 8: Anaerobic gram-negative *cocci*

Group 10: Anoxygenic phototrophic bacteria

Group 11: Oxygenic phototrophic bacteria

Group 12: Aerobic chemolithotrophic bacteria and associated organisms

Group 13: Budding and/or appendaged bacteria

Group 14: Sheathed bacteria

Group 15: Nonphotosynthetic, nonfruiting gliding bacteria

Group 16: The fruiting, gliding bacteria and the *Myxobacteria*

Group 17: Gram-positive *cocci*

Group 18: Endospore-forming gram-positive rods and *cocci*

Group 19: Regular, nonsporing, gram-positive rods

Group 20: Irregular, nonsporing, gram-positive rods

Group 21: The *mycobacteria*

Groups 22–29: The *actinomycetes*

Group 22: *Nocardioform actinomycetes*

Group 23: Genera with multiocular *sporangia*

Group 24: *Actinoplanetes*

Group 25: *Streptomycetes* and related genera

Group 26: *Maduromycetes*

Group 27: *Thermomonospora* and related genera

Group 28: *Thermoactinomycetes*

Group 29: Genus *Glycomyces*, Genus *Kitasatospira* and Genus *Saccharothrix*

Group 30: The Mycoplasmas—cell wall-less bacteria

Group 31: The Methanogens

Group 32: Archaeal sulfate reducers

Group 33: Extremely halophilic, *archaeobacteria* (*halobacteria*)

Group 34: Cell wall-less *archaeobacteria*

Group 35: Extremely thermophilic and hyperthermophilic $S^0$-metabolizers.

In addition, suitable bacteria may include facultative anaerobes and microaerophilic anaerobes, which are capable of surviving at low levels of oxygen. These bacteria do not require strict anaerobic conditions such as the obligate anaerobes. Acidophilic, alkaliphilic, anaerobe, anoxygenic, autotrophic, chemolithotrophic, chemoorganotroph, chemotroph, halophilic, methanogenic, neutrophilic, phototroph, saprophytic, thermoacidophilic, and thermophilic bacteria may be used. Hydrocarbon and oxygen injection may encourage the growth of other microorganisms such as fungi, protozoa and algae that may be beneficial to the metal recovery process. The injected oxygen may be in the form of air (e.g., dry air comprising 20.9 percent oxygen), a gas stream with varying concentrations of oxygen, substantially pure oxygen, or the like.

Recovery of the metal involves the removal of at least a portion of the metal contained in or on the metal-containing support material. For example, from about one percent to substantially all of the metal contained in the support material may be recovered. Recovery may be achieved using various techniques such as heaps, slurries, precipitation lagoons and bioreactors. During the treatment process, metals may be deposited on a metal deposition material comprising, for example, a polymer, felt, rubber, metallic or natural fiber material that is porous or non-porous. The deposition material may be provided in sheet form or in other forms that provide increased surface area such as spheres and other geometric shapes.

FIG. 1 schematically illustrates an anaerobic and aerobic metal recovery system 10 in accordance with an embodiment of the present invention. A metal-containing support material such as low grade ore 12 is fed to a rock crusher 14. Crushed ore 16 from the rock crusher 14 is fed to a bioleaching lagoon 18 lined with a membrane 19 and equipped with mixers 20 and 21. A source of hydrocarbon 22 such as butane is connected to hydrocarbon injectors 24 in the bioleaching lagoon 18.

After treatment in the bioleaching lagoon, the material is pumped 26 to a precipitation lagoon 28 equipped with mixers 30 and 31. A hydrocarbon/oxygen source 32 is connected to injectors 34 in the precipitation lagoon 28. A membrane 36 lines the precipitation lagoon 28. After treatment in the lagoon 28, liquid 38 comprising water and the support material is removed from the precipitation lagoon 28. Metal deposited on the membrane liner 36 may be recovered from the precipitation lagoon 28 at suitable intervals.

In the embodiment shown in FIG. 1, the first phase of the metal recovery process occurs in the bioleaching lagoon 18 under anaerobic conditions. Within the lagoon 18, the metal-containing support material is contacted with the hydrocarbon to accelerate the transformation of aerobic conditions to anaerobic conditions. This is accomplished by initially accelerating the activity of aerobic hydrocarbon-utilizing bacteria in the presence of oxygen present in the lagoon 18 in order to produce carbon dioxide. Under the resultant anaerobic conditions, the hydrocarbon will serve as an electron donor, thereby accelerating anaerobic microbiological treatment processes. In the bioleaching lagoon, the crushed ore 16 is pretreated for subsequent recovery in the precipitation lagoon. The second phase of the metal recovery process occurs in the precipitation lagoon 28, where the aerobic cycle with air injection may be used to accelerate metal precipitation.

Figure 2:
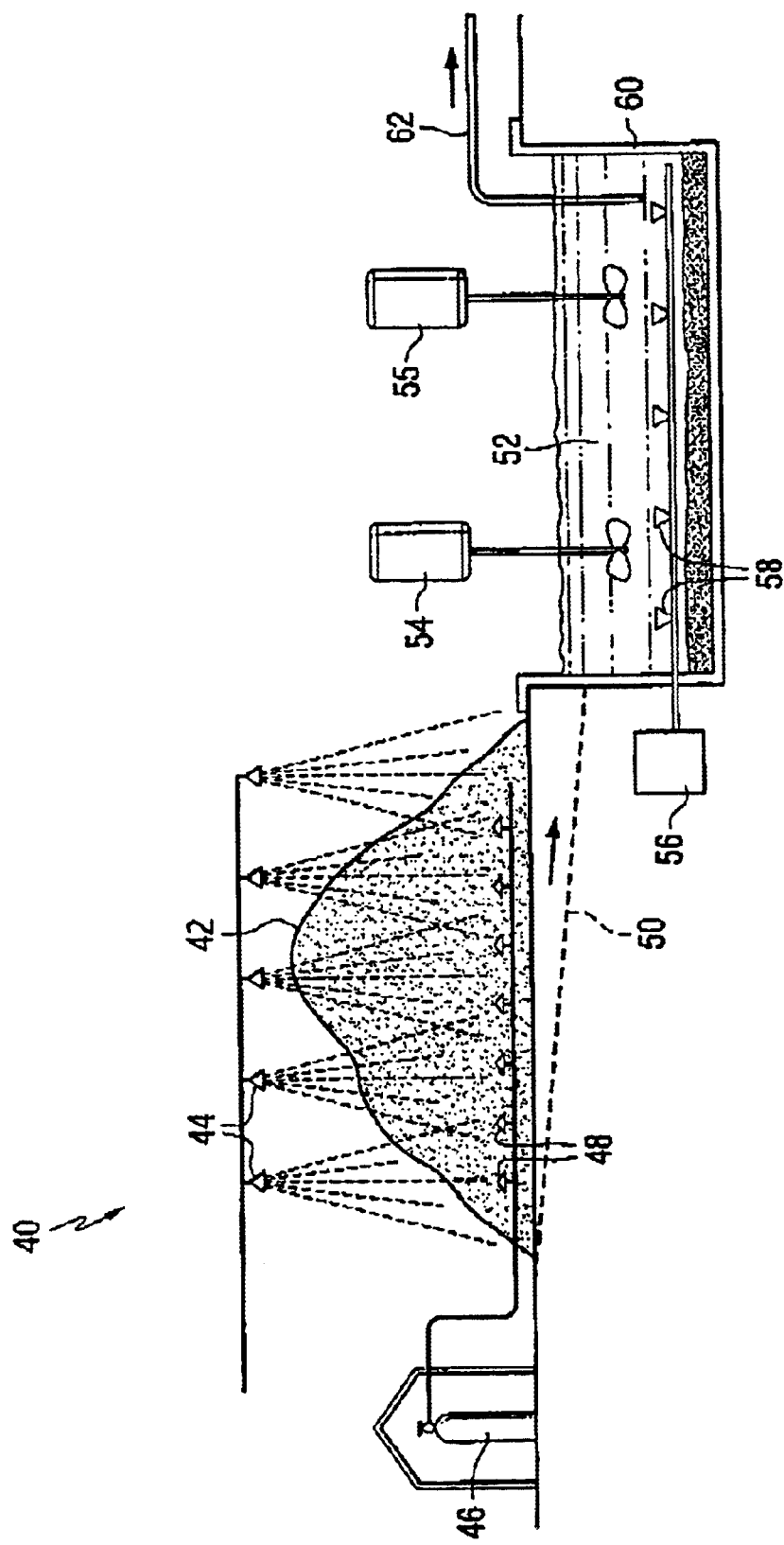
FIG. 2 is a schematic diagram illustrating the use of aerobic hydrocarbon-utilizing bacteria in a heap to biooxidize and precipitate metals from a metal-containing support material.

FIG. 2 schematically illustrates an aerobic metal recovery system 40 in accordance with another embodiment of the present invention. A heap 42 comprising the metal-containing support material is subjected to water spray by a sprinkler system 44. A hydrocarbon/oxygen supply 46 is connected to injectors 48 in the heap 42. An effluent trench 50 under the heap 42 carries effluent to a precipitation lagoon 52 equipped with mixers 54 and 55. Alternatively, the effluent could be pumped to the lagoon 52. Another hydrocarbon/oxygen supply 56 is connected to injectors 58 in the lagoon 52. A membrane liner 60 lines the lagoon 52. After treatment in the lagoon 52, liquid 62 comprising water and the support material is removed from the lagoon 52. Metal deposited on the membrane liner 60 may be recovered from the lagoon 52 at suitable intervals.

In the embodiment shown in FIG. 2, the heap 42 may comprise ore deposits. The piping 48 through which the hydrocarbon/oxygen mixture or hydrocarbon alone is delivered may be operated under steady or intermittent pulses. The sprinkler system 44 flushes the oxidized metal values from the heap 42 and creates an effluent solution, which flows to the precipitation lagoon 52. In the precipitation lagoon 52, the hydrocarbon-utilizing bacteria and injected oxygen deposit the metal values onto the membrane deposition material 60 for recovery.

Based on the molecular weight of specific metals, the different metal precipitate out of solution at differing time intervals, thereby providing the opportunity to replace the membrane liners during successive depositional events. Alternatively, electrolysis methods may be employed to further separate the precipitating metals. The metals may then be easily assayed and further refined using conventional techniques.

Whereas particular embodiments of this invention have been described above for purposes of illustration, it will be evident to those skilled in the art that numerous variations of the details of the present invention may be made without departing from the invention.

What is claimed is:

1. A method of recovering a metal from a metal-containing support material, the method comprising:
   contacting the support material with butane to stimulate growth of butane-utilizing bacteria in the support material, wherein the butane is provided as a butane substrate comprising at least about 10 weight percent butane; and
   recovering the metal from the support material.

2. The method of claim 1, wherein the butane substrate comprises butane as the most prevalent compound of the substrate on a weight percentage basis.

3. The method of claim 1, wherein the butane substrate comprises at least about 50 weight percent butane.

4. The method of claim 1, wherein the butane substrate comprises at least about 90 weight percent butane.

5. The method of claim 1, wherein the butane substrate comprises at least about 99 weight percent n-butane.

6. The method of claim 1, wherein the butane and the support material are provided in a solution.

7. The method of claim 6, wherein the solution comprises water.

8. The method of claim 1, wherein the butane is introduced to the butane-utilizing bacteria intermittently.

9. The method of claim 1, wherein the butane is introduced to the butane-utilizing bacteria continuously.

10. The method of claim 1, wherein the butane-utilizing bacteria are selected from the group consisting of aerobic bacteria, anaerobic bacteria, facultative anaerobes and microaerophilic anaerobes.

11. The method of claim 1, wherein the butane-utilizing bacteria comprise aerobic bacteria.

12. The method of claim 1, wherein the butane-utilizing bacteria comprise anaerobic bacteria.

13. The method of claim 1, wherein the butane-utilizing bacteria are selected from the group consisting of *Pseudomonas, Variovorax, Nocardia, Chryseobacterium, Comamonas, Acidovorax, Rhodococcus, Aureobacterium, Micrococcus, Aeromonas, Stenotrophomonas, Sphingobacterium, Shewanella, Phyllobacterium, Clavibacter, Alcaligenes, Gordona, Corynebacterium* and *Cytophaga*.

14. The method of claim 1, wherein the butane-utilizing bacteria are selected from the group consisting of *putida,*

*rubrisubalbicans, aeruginosa, paradoxus, asteroides, brasiliensis, restricta, globerula, indologenes, meningosepticum, acidovorans, delafieldii, rhodochrous, erythropolis, fascians, barkeri, esteroaromaticum, saperdae, varians, kristinae, caviae, maltophilia, thalpophilum, spiritivorum, putrefaciens B, myrsinacearum, michiganense, xylosoxydans, terrae, aquaticum B* and *johnsonae*.

15. The method of claim 1, wherein the support material comprises a mineral ore.

16. The method of claim 1, wherein the support material comprises a refractory ore.

17. The method of claim 1, wherein the support material comprises a sulfide mineral ore.

18. The method of claim 1, wherein the metal is selected from the group consisting of gold, silver, platinum, palladium, copper, zinc, nickel and uranium.

19. The method of claim 1, further comprising introducing oxygen to the butane-utilizing bacteria.

20. The method of claim 19, wherein the oxygen is provided in the form of air or substantially pure oxygen.

21. The method of claim 19, wherein the oxygen is provided to the butane-utilizing bacteria continuously.

22. The method of claim 19, wherein the oxygen is provided to the butane-utilizing bacteria intermittently.

23. The method of claim 1, wherein the metal is recovered from the support material by precipitating the metal out of a solution comprising the support material.

24. The method of claim 1, wherein the metal is recovered from the support material by depositing the metal on a deposition material.

25. The method of claim 1, wherein the support material is provided in a heap.

26. The method of claim 25, further comprising adding water to the heap.

27. The method of claim 26, further comprising adding oxygen to the heap.

28. A system for recovering a metal from a metal-containing support material, the system comprising:
   means for contacting the support material with butane to stimulate growth of butane-utilizing bacteria in the support material, wherein the butane is provided as a butane substrate comprising at least about 10 weight percent butane; and
   means for recovering the metal from the support material.

29. The system of claim 28, wherein the butane substrate comprises butane as the most prevalent compound of the substrate.

30. The system of claim 28, wherein the butane substrate comprises at least about 50 weight percent butane.

31. The system of claim 28, wherein the butane substrate comprises at least about 90 weight percent butane.

32. The system of claim 28, wherein the butane is introduced to the butane-utilizing bacteria intermittently.

33. The system of claim 28, wherein the metal is selected from the group consisting of gold, silver, platinum, palladium, copper, zinc, nickel and uranium.

34. A system for recovering a metal from a metal-containing support material, the system comprising:
   a source of butane;
   a butane injection system in communication with the butane source and the support material for stimulating growth of butane-utilizing bacteria in the support material, wherein the butane is provided as a butane substrate comprising at least about 10 weight percent butane; and
   a deposition material upon which the metal is deposited.

35. The system of claim 34, wherein the butane substrate comprises butane as the most prevalent compound of the substrate.

36. The system of claim 34, wherein the butane substrate comprises at least about 50 weight percent butane.

37. The system of claim 34, wherein the butane substrate comprises at least about 90 weight percent butane.

38. The system of claim 34, wherein the butane is introduced to the butane-utilizing bacteria intermittently.

39. The system of claim 34, wherein the metal is selected from the group consisting of gold, silver, platinum, palladium, copper, zinc, nickel and uranium.

40. The system of claim 34, further comprising:
   a source of oxygen; and
   an oxygen injection system in communication with the oxygen source and the support material.

41. The system of claim 40, wherein the oxygen is supplied in the form of air or substantially pure oxygen.

42. A method of recovering a metal from a metal-containing support material, the method comprising:
   contacting the support material with a butane substrate to stimulate growth of butane-utilizing bacteria in the support material, wherein butane is the most prevalent compound of the substrate on a weight percentage basis; and
   recovering the metal from the support material.

43. A system for recovering a metal from a metal-containing support material, the system comprising:
   means for contacting the support material with a butane substrate to stimulate growth of butane-utilizing bacteria in the support material, wherein the butane substrate comprises butane as the most prevalent compound of the butane substrate; and
   recovering the metal from the support material.

44. A system for recovering a metal from a metal-containing support material, the system comprising:
   a source of butane substrate, wherein butane is the most prevalent compound of the substrate;
   a butane injection system in communication with the source of butane substrate and the support material for stimulating growth of butane-utilizing bacteria in the support material; and
   a deposition material upon which the metal is deposited.

45. A method of recovering a metal from a metal-containing support material, the method comprising:
   contacting the support material with at least one alkane to stimulate growth of alkane-utilizing bacteria in the support material, wherein the at least one alkane is introduced to the alkane-utilizing bacteria intermittently; and
   recovering the metal from the support material.

46. A method of recovering a metal from a metal-containing support material, the method comprising:
   contacting the support material with at least one alkane to stimulate growth of alkane-utilizing bacteria in the support material;
   introducing oxygen intermittently to the alkane-utilizing bacteria; and
   recovering the metal from the support material.

47. A system for recovering a metal from a metal-containing support material, the system comprising:
   means for contacting the support material with at least one alkane to stimulate growth of alkane-utilizing bacteria in the support material, wherein the at least one alkane is introduced to the alkane-utilizing bacteria intermittently; and means for recovering the metal from the support material.

48. A system for recovering a metal from a metal-containing support material, the system comprising:

a source of at least one alkane;

an alkane injection system in communication with the alkane source and the support material for stimulating growth of alkane-utilizing bacteria in the support material, wherein the at least one alkane is introduced to the alkane-utilizing bacteria intermittently; and a deposition material upon which the metal is deposited.

49. A method of recovering a metal from a metal-containing support material, the method comprising:

contacting the support material with at least one alkane to stimulate growth of alkane-utilizing bacteria in the support material, wherein the at least one alkane and the support material are provided in a solution; and recovering the metal from the support material.

* * * * *